(12) United States Patent
Jimenez et al.

(10) Patent No.: US 10,919,338 B2
(45) Date of Patent: Feb. 16, 2021

(54) UNITIZED WHEELEND ASSEMBLY AND METHOD OF INSTALLATION

(71) Applicant: STEMCO PRODUCTS, INC., Charlotte, NC (US)

(72) Inventors: Daniel Jimenez, Diana, TX (US); Monte Pearson, Longview, TX (US); Yang Julia Xiang, Longview, TX (US)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 16/606,670

(22) PCT Filed: May 23, 2018

(86) PCT No.: PCT/US2018/034102
§ 371 (c)(1),
(2) Date: Oct. 18, 2019

(87) PCT Pub. No.: WO2018/217870
PCT Pub. Date: Nov. 29, 2018

(65) Prior Publication Data
US 2020/0324574 A1    Oct. 15, 2020

Related U.S. Application Data

(60) Provisional application No. 62/511,622, filed on May 26, 2017.

(51) Int. Cl.
*B60B 27/02* (2006.01)
*B60B 27/00* (2006.01)

(52) U.S. Cl.
CPC ............ *B60B 27/02* (2013.01); *B60B 27/001* (2013.01); *B60B 27/0073* (2013.01);
(Continued)

(58) Field of Classification Search
CPC ... B60B 27/02; B60B 27/001; B60B 27/0078; B60B 27/065; B60B 27/06;
(Continued)

(56) References Cited

U.S. PATENT DOCUMENTS

| 2,052,024 A | 8/1936 | Baker |
| 2,052,524 A * | 8/1936 | Baker ................... B60B 35/121 384/589 |

(Continued)

FOREIGN PATENT DOCUMENTS

| CA | 2725966 A1 | 12/2011 |
| CN | 206242807 | 6/2017 |

(Continued)

OTHER PUBLICATIONS

International Searching Authority, International Search Report and Written Opinion, PCT/US2018/034102, Applicant: Stemco Products, Inc., dated Sep. 13, 2018, 7 pages.

(Continued)

*Primary Examiner* — Scott A Browne
(74) *Attorney, Agent, or Firm* — Perkins Coie LLP

(57) ABSTRACT

A unitized wheelend is provided. The unitized wheelend includes a hub having an inboard side bounded by an oil seal and an outboard side bounded by a retainer releasably coupled to the hub. The unitized wheelend assembly includes an inboard bearing assembly, a spacer, an outboard bearing assembly, and a spindle nut assembly.

6 Claims, 9 Drawing Sheets

(52) U.S. Cl.
CPC ....... *B60B 27/0084* (2013.01); *B60B 2380/14* (2013.01); *F16C 2326/02* (2013.01)

(58) Field of Classification Search
CPC ............ B60B 27/0073; B60B 27/0084; B60B 2380/14; F16C 19/548; F16C 19/364; F16C 25/06; F16C 2326/02
See application file for complete search history.

(56) References Cited

U.S. PATENT DOCUMENTS

| | | | | |
|---|---|---|---|---|
| 5,795,037 | A * | 8/1998 | Hagelthorn | B60B 27/001 |
| | | | | 301/105.1 |
| 6,533,363 | B1 * | 3/2003 | Hayes | F16C 33/6607 |
| | | | | 184/5.1 |
| 8,016,531 | B2 * | 9/2011 | White | F16C 25/06 |
| | | | | 411/216 |
| 9,574,612 | B2 * | 2/2017 | Rode | F16C 19/364 |
| 2007/0215032 | A1 * | 9/2007 | Melberg | F16C 19/525 |
| | | | | 116/218 |
| 2009/0245969 | A1 * | 10/2009 | White | F16C 25/06 |
| | | | | 411/215 |
| 2010/0266331 | A1 * | 10/2010 | Peterkort | F16C 19/364 |
| | | | | 403/26 |
| 2011/0062772 | A1 | 3/2011 | White | |

FOREIGN PATENT DOCUMENTS

| | | |
|---|---|---|
| DE | 19956838 C1 | 12/2000 |
| EP | 0733494 | 9/1996 |
| RU | 2224661 | 2/2004 |
| WO | 2018217870 | 11/2018 |

OTHER PUBLICATIONS

EP Application No. 18805594.1, Extended European Search Report, dated Dec. 16, 2020, 6 pgs.

* cited by examiner

UNITIZED WHEELEND ASSEMBLY AND METHOD OF INSTALLATION

CROSS-REFERENCE TO RELATED PATENT APPLICATIONS

The present application claims priority to U.S. Provisional Patent Application Ser. No. 62/511,622, filed May 26, 2017, the disclosure of which is incorporated herein as if set out in full.

BACKGROUND

A wheelend assembly typically includes a main body or hub defining a cavity that receives an axle, spindle, or the like. The main body houses an inboard bearing assembly, a spacer, and an outboard bearing assembly. The spacer generally acts to maintain the distance between the inboard bearing assembly and the outboard bearing assembly and may allow limited movement of both such that the bearing and the associated race/cup can properly seat.

The inboard bearing assembly is on the inboard side and is bounded by an oil seal. The oil seal secures the inboard side of the wheelend assembly to inhibit the inboard bearing, the spacer, etc. from moving further. An end cap is typically placed over the outboard bearing and coupled to the main body to inhibit the wheelend assembly from unloading to the outboard side of the main body.

The race/cup for the bearing seat in the final assembly between outer surface of the axle and the inner surface of the main body. The bearings, as can be appreciated, may be misaligned with the axle outer surface when installing the wheelend assembly onto the axle. An alignment insert, such as a sleeve or the like, may be used to hold the outboard bearing assembly and spacer in alignment until the axle is inserted into the space and pushes the alignment insert out of the main body.

After the wheelend assembly is fitted onto the axle, the bearings assemblies are firmly set onto the axle, and the end cap is removed. An axle nut, or spindle nut, is next fitted over the axle and tightened to bear against the outboard surface of the outboard bearing assembly. The axle nut presses the outboard bearing assembly against the spacer and seats the outboard bearing in its race/cup. The axle nut also presses the inboard bearing assembly against an axle shoulder that seats the inboard bearing in its race/cup.

While providing a wheelend assembly is beneficial, installation of the final wheelend assembly requires multiple steps and skill to install the various parts properly. Thus, against this background, it would be desirous to provide a unitized wheelend assembly.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a unitized wheelend assembly is provided. The unitized wheelend assembly includes a hub having an inboard side and an outboard side defining a cavity. The inboard side of the hub is bounded by an oil seal and the outboard side is bounded by a retainer. The retainer retains an inboard bearing assembly, a spacer, an outboard bearing assembly and a spindle nut in the unitized wheelend assembly. In certain embodiments, the unitized wheelend assembly may include an alignment insert internal to the outboard bearing assembly and the spacer.

In some aspects of the technology, the retainer comprises a flanged surface and a plurality of bolt bores arranged on the flanged surface to allow bolts on the hub to be inserted through the bolt bores, such that the retainer is releaseably coupled to the hub by at least one nut being threaded on at least one bolt.

In some aspects of the technology, the retainer comprises opposed protruding surfaces each of which having at least one bore. A spring clip is coupled to the opposed protruding surfaces, the spring clip comprising an engagement bore having a first position aligned one of the at least one bore such that a bolt on the hub is movable through the one of the at least one bore and the engagement bore and a second position where an edge of the engagement bore is configured to engage the bolt to inhibit removal of the retainer from the hub.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

Figure 5:
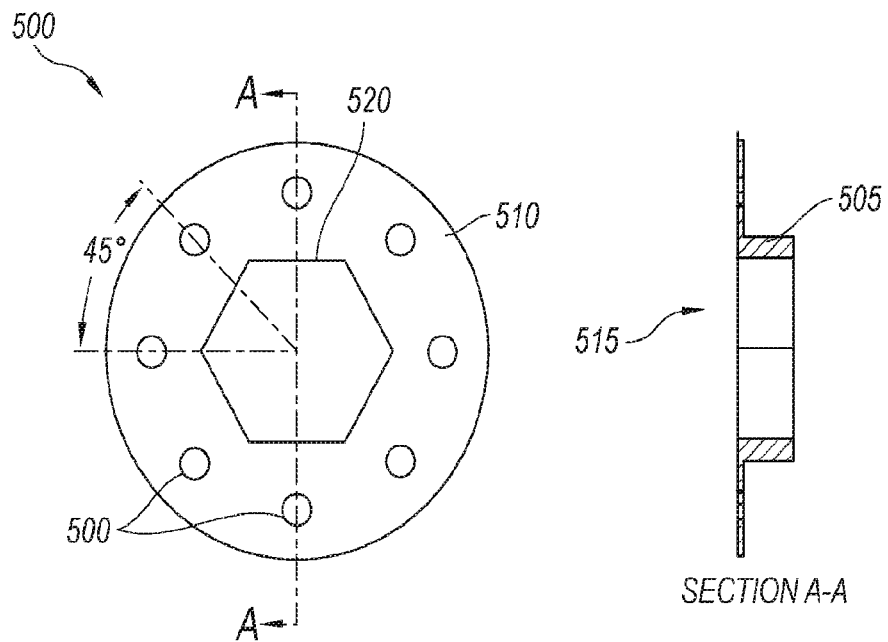

FIG. 5 if a plan view and cross-sectional view of a retainer consistent with the technology of the present application.

Figure 6:
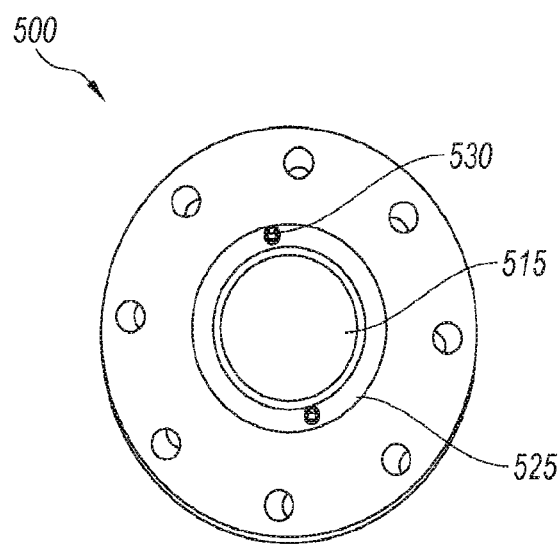

FIG. 6 is a plan view of a version of the retainer of FIG. 5.

Figure 7:
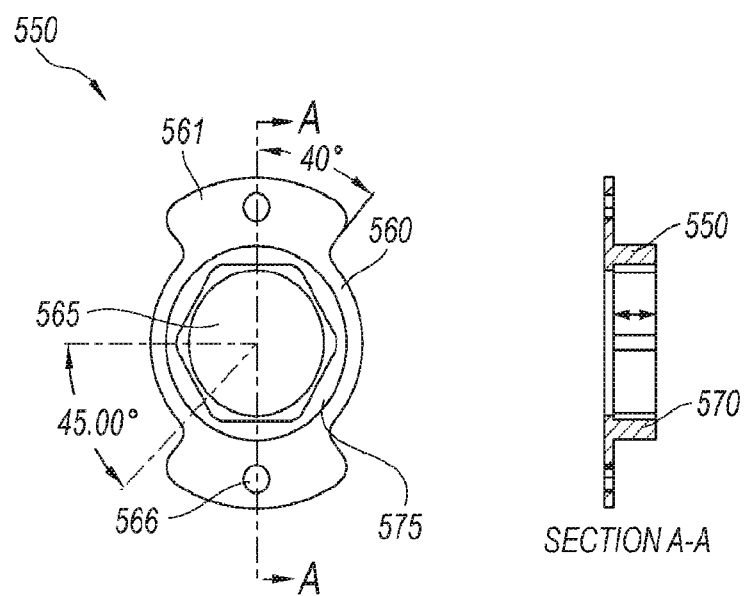

FIG. 7 is a plan view and cross-sectional view of a retainer consistent with the technology of the present application.

Figures 8, 9:
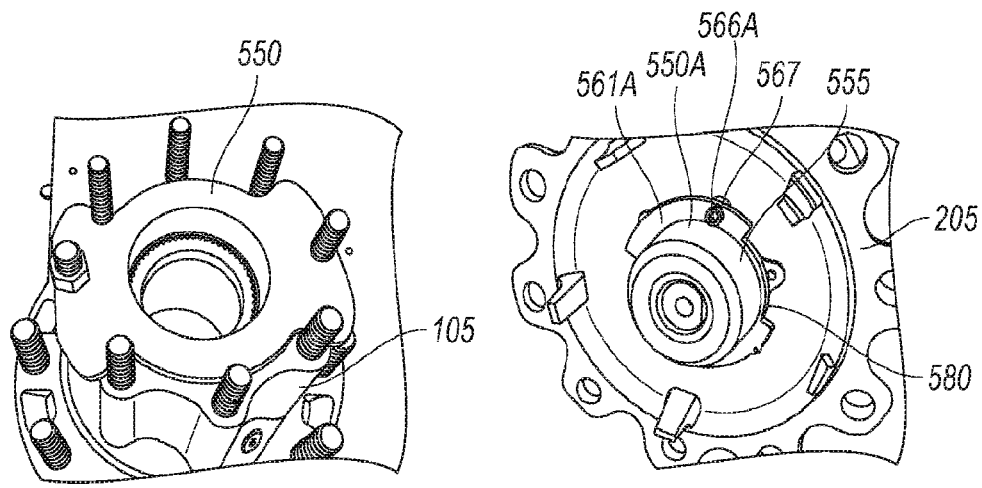

FIG. 8 is a perspective view of the retainer of FIG. 7 partially coupled to a hub.

FIG. 9 is a perspective view of a configuration of the retainer of FIG. 7 consistent with the technology of the present application.

Figure 10:
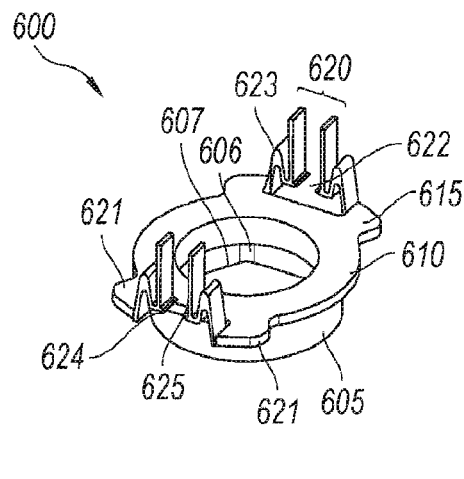

FIG. 10 is a perspective view of a retainer consistent with the technology of the present application.

Figure 11:
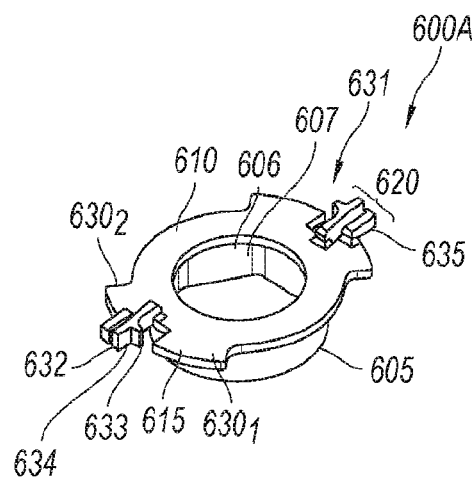

FIG. 11 is a perspective view of a retainer consistent with the technology of the present application.

Figure 12:
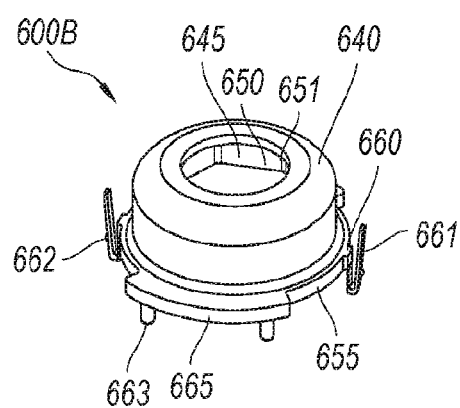

FIG. 12 is a perspective view of a retainer consistent with the technology of the present application.

Figure 13:
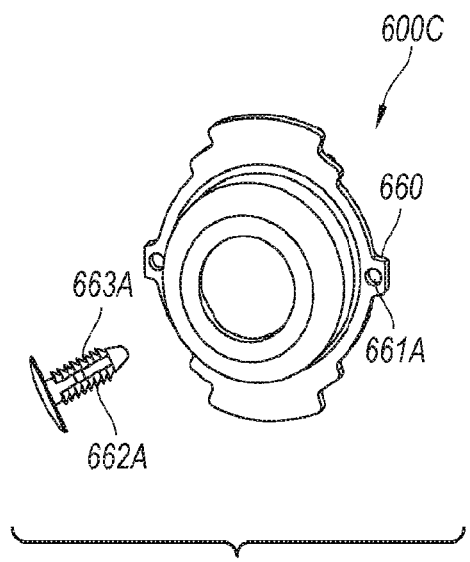

FIG. 13 is a perspective view of a retainer consistent with the technology of the present application.

Figure 14:
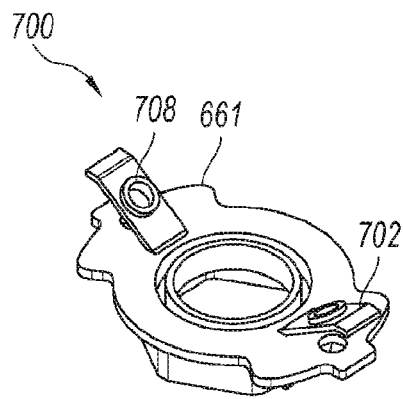

FIG. 14 is a perspective view of a retainer consistent with the technology of the present application.

Figure 15:
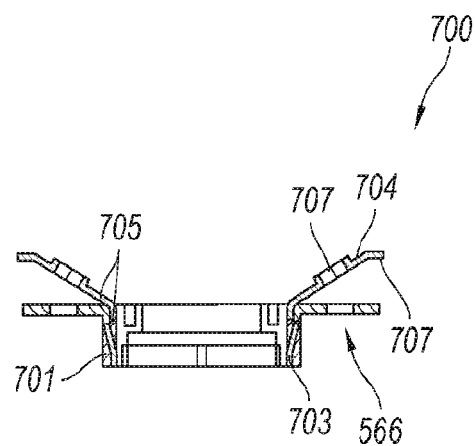

FIG. 15 is a cross sectional view of the retainer of FIG. 14.

Figure 16:
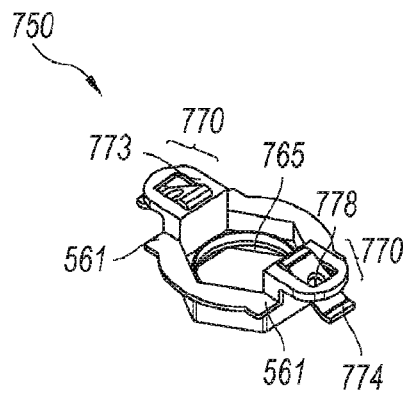

FIG. 16 is a perspective view of a retainer consistent with the technology of the present application.

Figure 17:
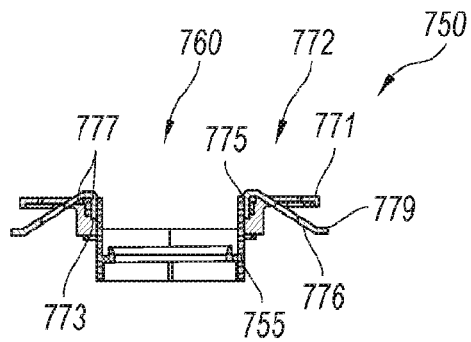

FIG. 17 is a cross sectional view of the retainer of FIG. 16.

Figure 18:
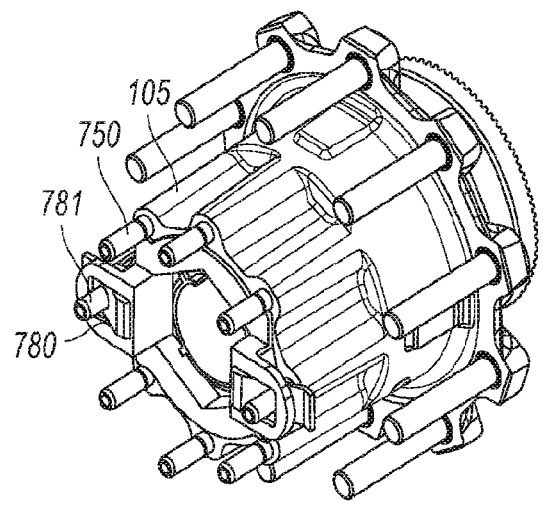

FIG. 18 is a perspective view of the unitized wheelend assembly with the retainer of FIG. 16.

Figure 19:
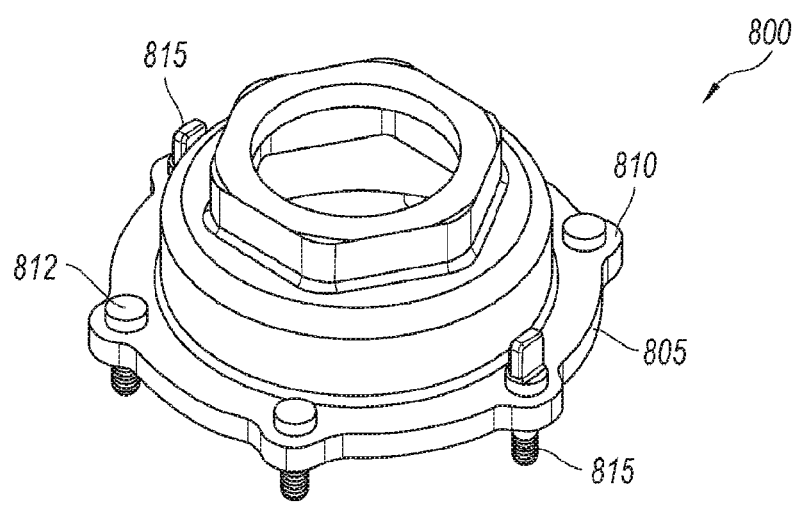

FIG. 19 is a perspective view of a retainer consistent with the technology of the present application.

Figure 20:
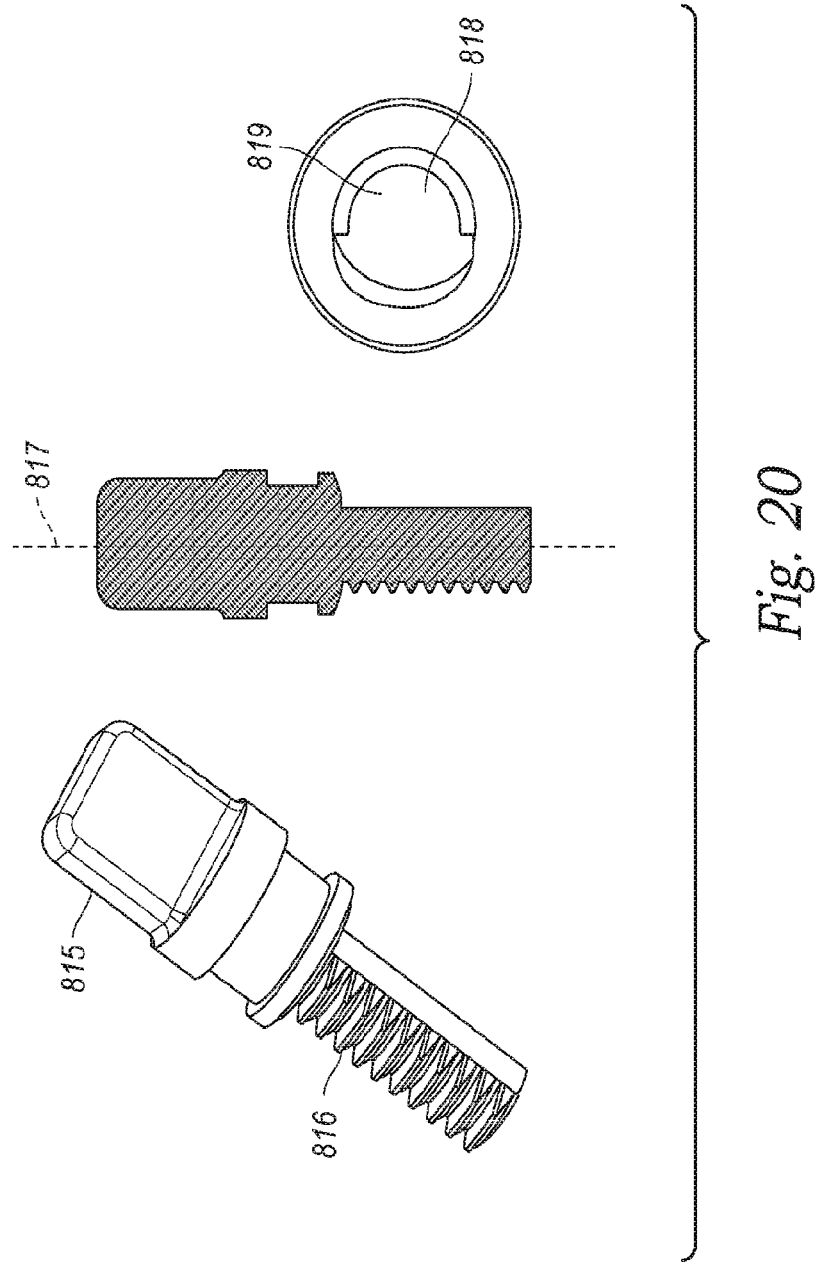

FIG. 20 are multiple views of a stud to couple the retainer of FIG. 19 to the unitized wheeled assembly consistent with the technology of the present application.

Figure 21:
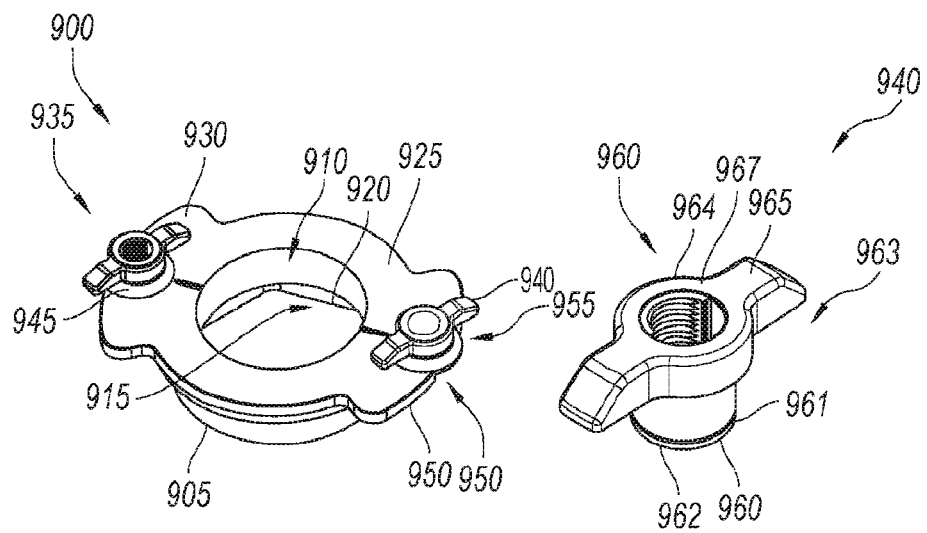

FIG. 21 is a retainer consistent with the technology of the present application.

Figure 22:
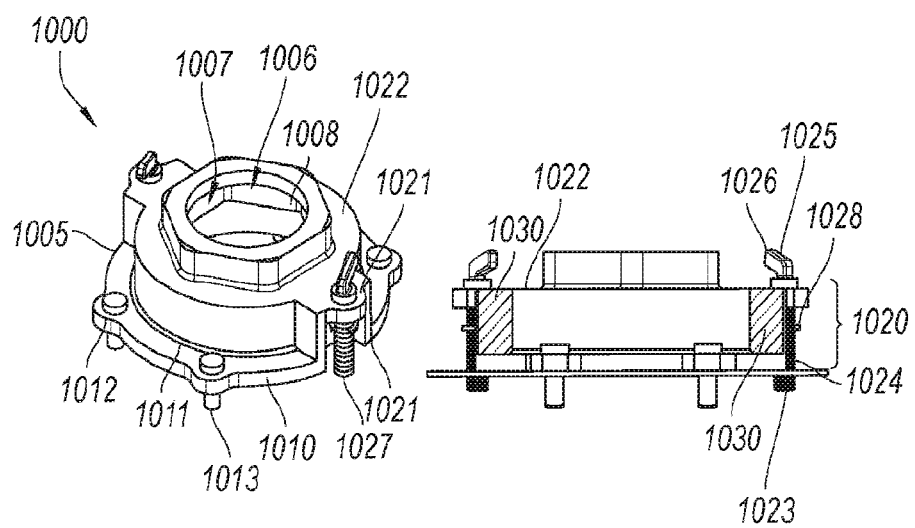

FIG. 22 is a retainer consistent with the technology of the present application.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a unitized wheelend assembly. Unitized in this particular exemplary embodiment means the entire assembly is held together prior to installation on the axle/spindle and, once engaged with the axle/spindle, the retainer need only be removed for the unitized wheelend assembly to be ready for use or operation. The technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
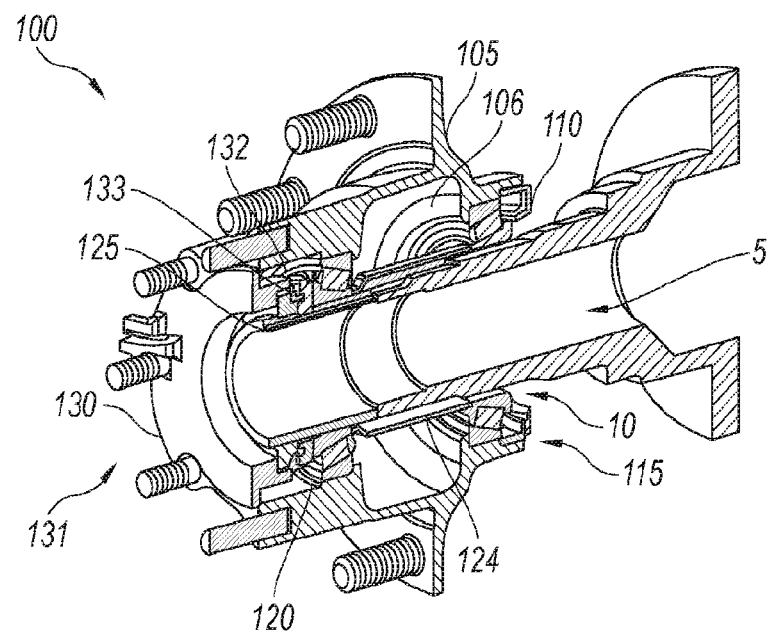
FIG. 1 is a perspective view of a unitized wheelend assembly consistent with the technology of the present application.
Figure 2:
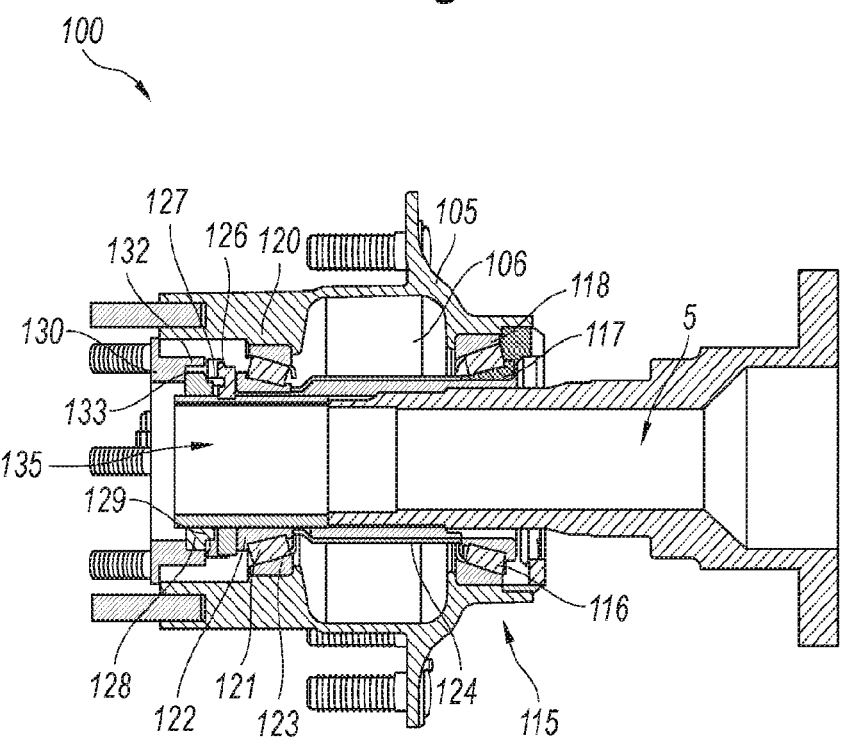
FIG. 2 is a cross sectional view of the unitized wheelend assembly of FIG. 1.

With reference now to FIGS. 1 and 2, a cross sectional view of a unitized wheelend assembly 100 for installation is provided. The unitized wheelend assembly 100 is defined as unitized because it provides an assembly inclusive of a hub or main body 105 defining, among other things a cavity 106, an inboard oil seal 110, an inboard bearing assembly 115 having a bearing 116, a bearing race 117, and a bearing cup 118, an outboard bearing assembly 120 having a bearing 121, a bearing race 122, and a bearing cup 123, a spacer 124 residing between the inboard bearing assembly 115 and the outboard bearing assembly 120, a unitized spindle nut assembly 125 having a washer 126, a collar 127, and a nut 128 (in this exemplary spindle nut 125), and a retainer 130, which is explained further below. The cavity 106 may hold lubrication such as oil or the like as required. As shown in FIG. 1, the unitized wheelend assembly 100 is shown partially on spindle 5. Optionally, an alignment insert 135 may be used in unitized wheelend assembly 100. The alignment insert 135 maintains the alignment of the outboard bearing assembly 120 and spacer 125 until the unitized wheelend assembly 100 is placed on the spindle 5.

The retainer 130, which will be explained further below, engages the spindle nut assembly 125. The nut 128 of the spindle nut assembly 125 generally has a shape 129, such as a hexagonal, octagonal, or other generally non-round shape. The retainer 130 has a bore 131 and a counter bore 132 with a shape 133 to operatively engage the shape 129. The shape 129 and shape 133 may, in certain embodiments, be round but will generally have other key/keyway engagement to inhibit relative rotation. The retainer 130, as explained further below, couples to the hub 105 to form the unitized wheelend assembly 100 that allows a single assembly to be placed on the spindle 5.

Figure 3:
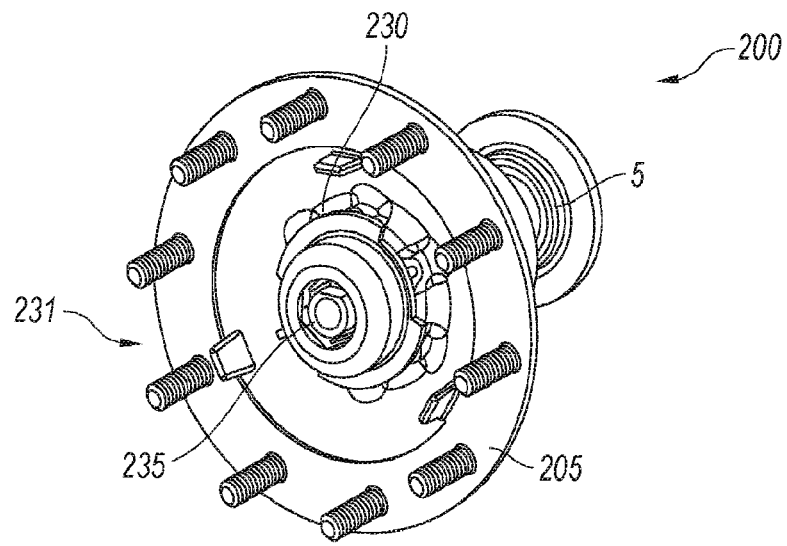
FIG. 3 is a perspective view of a unitized wheelend assembly consistent with the technology of the present application.
Figure 4:
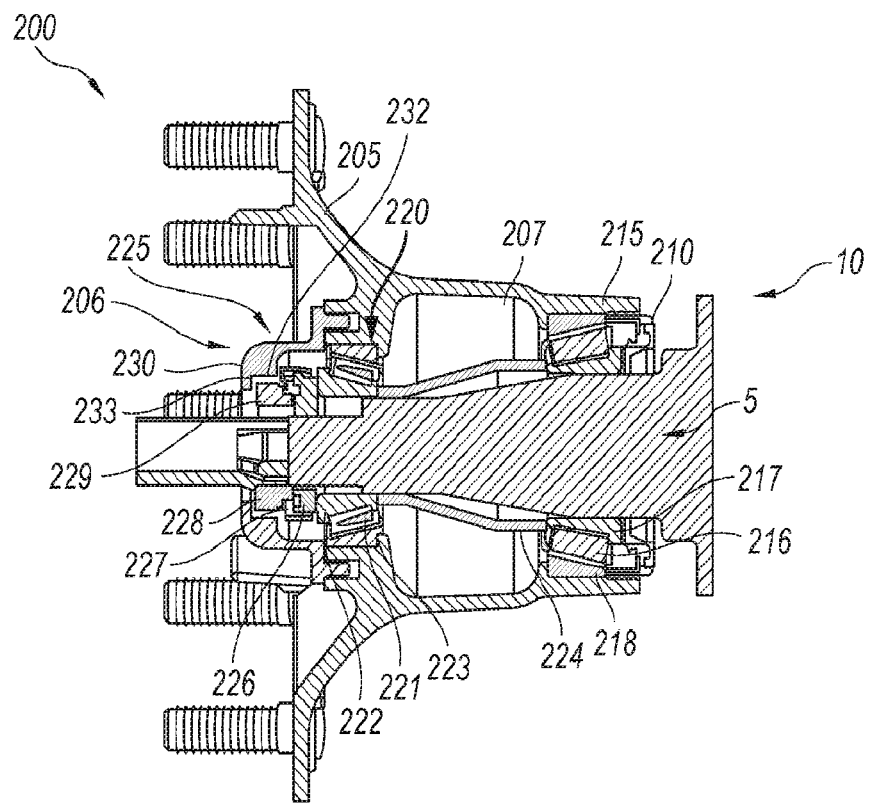
FIG. 4 is a cross sectional view of the unitized wheelend assembly of FIG. 3.

FIGS. 3 and 4 show a unitized wheelend assembly 200 configured to for use with an alternative hub 205 or main body 205. The hub 205, in this exemplary embodiment, has internal threads 206. The main body 205 defines a cavity 207. The unitized wheelend assembly 200 includes the hub 205, an inboard oil seal 210, an inboard bearing assembly 215 having a bearing 216, a bearing race 217, and a bearing cup 218, an outboard bearing assembly 220 having a bearing 221, a bearing race 222, and a bearing cup 223, a spacer 224 residing between the inboard bearing assembly 215 and the outboard bearing assembly 220, a unitized spindle nut assembly 225 having a washer 226, a collar 227, and a nut 228 (in this exemplary spindle nut 225), and a retainer 230. The cavity 207 may hold lubrication such as oil or the like as required. As shown in FIG. 1, the unitized wheelend assembly 200 is shown on spindle 5. Optionally, an alignment insert 235 may be used in unitized wheelend assembly 200. The alignment insert 235 maintains the alignment of the outboard bearing assembly 220 and spacer 225 until the unitized wheelend assembly 200 is placed on the spindle 5.

The retainer 230, which will be explained further below, engages the spindle nut assembly 225. The nut 228 of the spindle nut assembly 225 generally has a shape 229, such as a hexagonal or octagonal shape. The retainer 230 has a bore 231 and a counter bore 232 with a shape 233 to operatively engage the shape 229. The retainer 230 couples to the hub to form the unitized wheelend assembly 200, as explained below, that allows a single assembly to be placed on the spindle 5.

An installer or operator places the unitized wheel end assembly 100, 200 on spindle 5 by aligning the bore 10 of the unitized wheel end assembly 100, 200 with the spindle 5. The unitized wheel end assembly 100, 200 is pushed onto the spindle 5 until spindle 5 extends from the outboard side of the bore 131, 231 of the retainer 130, 230. If the unitized wheelend assembly 100, 200 included the optional alignment insert 135, 235, the alignment insert 135, 235 is forced out of the unitized wheel end assembly 100, 200 through the bore 131, 231 by the spindle 5 as it move through the unitized wheelend assembly 100, 200.

Once the unitized wheelend assembly 100, 200 is on the spindle 5, the unitized wheelend assembly 100, 200 is aligned, typically by spinning the unitized wheelend assembly 100, 200 on the spindle 5. A key, such as a tang (not specifically shown), on the inside surface of the spindle nut assembly 125, 225, engages a keyway (not specifically shown) on the outer surface of the spindle 5. Once the key 300 and keyway 310 engage, the unitized wheelend assembly 100, 200 is seated by continued rotation of the unitized wheelend assembly 100, 200. The retainer 130, 230 is removed once the unitized wheelend assembly 100, 200 is seated on the spindle 5. Alternatively, the retainer 130, 230 can be removed once the unitized wheelend assembly 100, 200 is aligned. The installer, operator may finish seating the unitized wheelend assembly 100, 200 on the spindle 5 using a torque wrench or the like.

FIG. 5 shows a top view and a cross section view of a retainer 500. The retainer 500 could be used for either retainer 130, 230 above. Dimensional information shown on FIG. 5 and any other figure should be considered exemplary of a designed prototype and not otherwise limiting. The retainer 500 has a cylindrical body 505 and a flanged surface 510. The flanged surface 510 includes a number of bolt bores 506 and a central bore 515. The central bore 515 has a shape 520 designed to engage the shape of the spindle nut assembly 125, 225. The bolt bores 506 are spaced to align with the inner bolts on the hub 100. The retainer 500 may be maintained on the hub 100 by one or more nuts (not specifically shown in FIG. 5). As shown in the view of FIG. 6, the retainer 500 may have a circular central bore 515 with a counter bore 525 having the shape 520. Further, FIG. 6 shows a pair of adjustment screws 530 designed to engage the spindle nut assembly 125, 225 in certain embodiments where the spindle nut assembly 125, 225 is modified to facilitate the engagement.

FIG. 7 shows a similar retainer 550. Retainer 550 has a cylindrical body 555 and a flanged surface 560 with opposed protruding surfaces 561 where each opposed protruding surface 561 has at least one bolt bore 566. While the various embodiments show the protruding surfaces, such as protruding surfaces 561, as opposed, the protruding surfaces may be asymmetrical in certain embodiments such that they are not opposed, but rather offset. The retainer 550 has a central bore 565 that is generally cylindrical and a counter bore 570 having a shape 575 designed to engage the shape of the spindle nut assembly 125, 225. The flanged surface 560 generally has a radius sufficiently small so the flanged surface does not engage any of the inner bolts. The opposed protruding surface 561 have a radius that allows the bolt bore 566 to align with the inner bolts.

FIG. 8 shows a prototype design of retainer 550 on the hub 105. FIG. 9 shows modified retainer 550A for use with unitized assembly 200. Modified retainer 550A has a cylindrical body 555 with opposed protruding surfaces 561A proximal an inboard edge 580 at the terminal end of the counter bore 570. The opposed protruding surfaces 561A each have at least one bolt bore 566A to receive a bolt 567 to couple the modified retainer 550A to the hub 205.

FIGS. 10 and 11 show another retainer 600 and 600A. The retainers 600 and 600A both have a cylindrical body 605 with a flanged surface 610 having opposed protruding surfaces 615. Each of the retainers 600 and 600A have a means for engaging 620 the bolts of the hub 105, which will be explained further below. The cylindrical body 605 has a counter bore 606 forming a shape 607 that engages an appropriate spindle nut assembly.

With specific reference to FIG. 10, the retainer 600 has opposed protruding surfaces 615. The protruding surfaces 615 are formed by fingers 621 extending outwardly from the flanged surface 610. The fingers 621 are separated by a gap 622. A spring member 623 is coupled to each finger 621, which spring members 623 are opposed to each other. As shown, the spring member 623 is a resilient clip, such as a spring metal or composite material. Each spring member 623 terminates at an engagement member 624 that can releasably engage a thread of the bolts on the hub 105. The engagement member 624 is a protrusion that engages a thread of the bolt in this exemplary embodiment. Other engagement members may include other friction fits or snap fit members. Extending from the engagement member 624 is a lever 625. Pinching the lever 625 causes the engagement member or members 624 to release from the thread allowing the retainer 600 to be removed by the installer or operator.

With specific reference to FIG. 11, the retainer 600A has opposed protruding surfaces 615. The protruding surfaces 615 are formed by fingers 630 that are separated by a gap 631. As shown, the fingers 630 may form asymmetrical surfaces as shown by finger $630_1$ having a larger surface area than finger $630_2$. A spring clip 632 is attached to one of the fingers 630 (or the flanged surface 610). The spring clip 632 includes an engagement member 633 that can engage the bolts on the hub 105. The spring clip 632 terminates in a tab 634 that can be used to manipulate the spring clip 632 such that the engagement member 633 engages or releases the bolt. A stop 635 may be provided to inhibit the amount of movement spring clip 632. The engagement member 633 (or 625) may operate similar to a ratchet such that it can slip onto the bolts while being installed, but cannot be removed without disengaging the engagement member. While shown as a single engagement member 633, the engagement member 633 may be a number of protrusions and/or threads to engage the threads of the bolts.

FIG. 12 shows a retainer 600B configured for unitized wheelend assembly 200. The retainer 600B comprises a cylindrical body 640 having a bore 645 and a counter bore 650. The counter bore 650 has a shape 651 configured to engage an appropriate spindle nut. The retainer 600B has a flanged surface 655 including protruding tabs 660 and opposed protruding surfaces 665. The protruding tabs 660 in this exemplary embodiment comprise spring clips 661 having a retaining lip 662. The spring clips 661 are compressed to fit into a corresponding bore on the hub 205. The retaining lip 662 moves through the bore and catches on an inboard side of the hub 205. To release, the spring clip 661 is squeezed until the retaining lip 662 enters the bore to allow the retainer 600B to be removed. The opposed protruding surfaces 665 may include studs 663 that fit in corresponding bores or the hub 205 to inhibit rotation. FIG. 13 shows a similar retainer 600C. Retainer 600C has protruding tabs 660 forming bores 661A. A connector 662A, such as a push pin or the like, is inserted into the bore 661A. The connector 662A extends through the bore 661A and a corresponding bore in the hub 205. The fins 663A act as ratchets to inhibit the connector 662A from falling out.

With reference to FIGS. 14 and 15, a retainer 700 is shown. The retainer 700 is similar to the retainer 550, and such similarities will not be further explained. The retainer 700 has opposed protruding surfaces 661 with a retaining slot 701 formed in the protruding surfaces 661 proximate the bolt bore 566. A spring clip 702 has a first end 703 formed to cooperatively fit within slot 701 and a second end 704 arranged at an angle 705 to the first end 703 to form the spring clip 702. The second end 704 has an engagement bore 706 and a tab 707. The spring clip 702 is biased such that the second end 704 positioned distal from the opposed protruding surfaces 661. To install or remove the retainer 700, the tabs 707 are depressed until the engagement bore 706 is aligned with the bolt bore 566. The bolt on the hub 105 is freely insertable when the engagement bore 706 is held in alignment with the bolt bore 566. Once installed, the tabs 707 are released allowing the second end to return towards it unbiased position. An edge 708 or the engagement bore 706 engages the bolt, such as at a thread, to hold the retainer 700 in place.

With reference to FIGS. 16 and 17, a retainer 750 is shown. The retainer 750 is similar to the retainer 600 above. The retainer 750 has a cylindrical body 755 having a bore 760 and a counter bore 765. The counter bore 765 is shaped to engage a corresponding spindle nut assembly. The retainer 750 has a pair of lock mechanisms 770, one on each of the opposed protruding surfaces 561. Each lock mechanism 770 has a protruding finger 771 with a bore 772 having a shape 773, which is shown as rectangular in this exemplary embodiment. The lock mechanisms 770 have a slot 773. A spring clip 774 has a first end 775 sized and shaped to fit within the slot 773. A second end 776 of the spring clip forms an acute angle 777 with the first end 775 and is sized and shaped to fit through the bore 772. The second end 776 of the spring clip 774 has an engagement bore 778 and terminates in a tab 779. Operation of the spring clip 774 is similar to the spring clip described above. The tabs 779 are depressed to align the engagement bore 778 with the bore 772. The bolts on hub 105 freely pass through engagement bore 778 when the tabs are pressed. When released, the second end 776 decompresses and an edge 780 on the engagement bore 778 frictionally engages the bolt, such as by engaging a thread or the like. FIG. 18 shows a perspective view of the retainer 750 on the hub 105 where the edge 780 is locked onto a bolt of the hub 105. As can be appreciated, forces tending to push the unitized wheeled assembly 100 parts outboard would force the spring clip 774 against the associated bolt 781 (sometimes referred to as a stud) to resist the force.

FIG. 19 shows a retainer 800 configured for the hub 205. The retainer 800 is similar to retainer 600C described above. The retainer 800 has a flanged surface 805 with a plurality of alignment bores 810. The alignment bores 810 align with bores in the hub 205. The alignment bores 810 are sized and shaped to cooperatively engage a pin 812, which may be used to facilitate rotational resistance. The alignment bores 810 also are sized and shaped to cooperatively engage one or more fasteners 815. Fastener 815 may be the same as connector 662A described above in certain embodiments. One specific fastener 815 is shown in FIG. 20, which provides a perspective view, a cross sectional view, and a plan view of fastener 815. Fastener 815, in this exemplary embodiment, has fins 816 on a single side of the fastener 815 and operates as a cam lock. The fastener 815 is offset from its longitudinal axis 817 such that it has a smaller diameter 818 for clearance of rotation and a larger diameter 819. The fastener 815 rotates between a locked and unlocked position to allow the retainer 800 to be locked to or removed from the unitized wheeled assembly.

FIG. 21 shows another retainer 900. Similar to other retainers herein, the retainer 900 has a generally cylindrical body 905 with a bore 910 and a counter bore 915. The counter bore 915 generally has a shape 920 configured to engage the shape of the spindle nut associated with the unitized wheeled assembly. The retainer 900 further includes a flanged surface 925. A pair of opposed fingers 930 extend from the flanged surface 925. The diameter of the flanged surface 925 is less than the diameter of the bolts. The width of the retainer 900 at the pair of opposed fingers 930 is at least sufficient to allow one or more bores 935 to fit over a corresponding bolt as explained above. Each bore 935 is configured to receive a cam nut lock 940, which cam nut lock 940 will be described further below. Each of the one or more bores 935 may have a cam nut lock engagement surface 945, which surface is shown slightly raised in the exemplary embodiment. The cam nut lock engagement surface 940 facilitates rotation of the cam nut lock 940. As shown, the cam nut lock engagement surface 945 may extend from an edge 950 of the opposed fingers 930. Further, the cam nut lock engagement surface 945 may have a thinner depth than the opposed fingers 930. A thinner depth provides a channel 950 on an inboard facing surface 955.

FIG. 21 also shows a detail of the cam nut lock 940 in isolation for clarity. The cam nut lock 940 has a cylindrical base 960 that is configured to be slidingly received in the bore 935. An inboard edge 961 of the cylindrical base has a lip 962. The lip 962 is configured to engage the surface of the channel 950 or the inboard facing surface 955. The lip 962 holds the cam nut lock 940 in rotational engagement with the retainer 900. The outboard side 963 of the cylindrical base 960 has a nut 964 with a pair of opposed arms 965, which may act as levers. The cam nut lock 940 has a bore 966 sized to receive the aforementioned bolts. The cam nut lock 940 has a plurality of protrusions 967, which may be partial threads, in the bore 966 that are removably engagable with the threads on the bolts (not shown in FIG. 21). The cam nut lock 940 has a first or unlocked position where the partial threads are rotated out of engagement with the bolt threads. In this first position, the bolt is sliding received in the bore 966. The cam nut lock 940 has a second or locked position where the partial threads are rotated into engagement with the bolt threads. In this second position, the retainer 900 is secured to the wheelend assemblies as described above.

FIG. 22 shows a retainer 1000. Retainer 1000 has some similarity to retainers 600C and 800 described above. Retainer 1000 has a generally cylindrical body 1005 with a bore 1006 and a counter bore 1007. The counter bore 1007 has a shape 1008 configured to engage a spindle nut assembly as described above. The retainer 1000 is designed for wheelend assemblies having internal threads, similar to assembly 200 described above. As such, the retainer 1000 has a flanged surface 1010 at an inboard edge 1011 of the cylindrical body 1005. The flanged surface 1010 has a plurality of bores 1012 arranged to align with bores in the wheelend assembly. One or more pins 1013 may be arranged in the bores 1012 to align the retainer 1000 on the wheelend assembly and inhibit rotation of the retainer 1000 with respect to the wheelend assembly.

Still with reference to FIG. 22, the retainer 1000 has a lock assembly 1020 to lock the retainer 1000 to the wheelend assembly. The lock assembly 1020 includes a radially extending alignment protrusion 1021 that extends from an outboard side 1022 of the cylindrical body 1005. The radially extending alignment protrusion 1021 includes a bore 1022 to receive a fastener 1023. The fastener 1023 may be a bolt having a shaft 1024 and a nut 1025. The nut 1024 of the fastener 1022 may include a lever 1026 to facilitate turning the fastener. The threads 1027 on the shaft 1024 engage the threads on the wheelend assembly by turning, for example, the lever 1026 to lock the retainer 1000 to the wheelend assembly. The fastener 1023 may have a stop 1028 on the shaft 1024 to inhibit the fastener 1023 from sliding from the bore 1022 when the threads 1027 are not engaged with the threads on the wheelend assembly. As shown, the stop 1028 may be, for example, a snap ring or the like. The lock assembly 1020 may include one or two radially extending walls 1030 that extend parallel to the long axis of the fastener 1022 between the radially extending alignment protrusion 1021 and the flanged surface 1010.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An apparatus comprising,
a unitized wheelend assembly comprising:
a hub having an inboard side and an outboard side defining a cavity therebetween;
an oil seal having an inboard side and an outboard side proximal the inboard side of the unitized wheelend assembly;
an inboard bearing assembly having an inboard side proximal the outboard side of the oil seal and an outboard side;
a spacer having an inboard side proximal the outboard side of the inboard bearing assembly and an outboard side;
an outboard bearing assembly having an inboard side proximal the outboard side of the spacer and an outboard side;
a spindle nut assembly, the spindle nut assembly having an inboard side proximal the outboard side of the outboard bearing and an outboard side, the spindle nut assembly having a shape; and
a retainer having an inboard side with a shape to cooperatively engage the shape of the spindle nut assembly and an outboard side, the retainer releasably coupled to the outboard side of the hub, wherein the retainer comprises a flanged surface and a plurality of bolt bores arranged on the flanged surface to allow bolts on the hub to be inserted through the bolt bores, such that the retainer is releasably coupled to the hub by at least one nut being threaded on at least one bolt wherein the spindle nut assembly is disposed of within the hub.

2. The apparatus of claim 1 further comprising an alignment insert internal to the outboard bearing assembly and the spacer.

3. An apparatus comprising,
a unitized wheelend assembly comprising:
a hub having an inboard side and an outboard side defining a cavity therebetween;
an oil seal having an inboard side and an outboard side proximal the inboard side of the unitized wheelend assembly;
an inboard bearing assembly having an inboard side proximal the outboard side of the oil seal and an outboard side;
a spacer having an inboard side proximal the outboard side of the inboard bearing assembly and an outboard side;
an outboard bearing assembly having an inboard side proximal the outboard side of the spacer and an outboard side;
a spindle nut assembly, the spindle nut assembly having an inboard side proximal the outboard side of the outboard bearing and an outboard side, the spindle nut assembly having a shape; and
a retainer having an inboard side with a shape to cooperatively engage the shape of the spindle nut assembly and an outboard side, the retainer releasably comprising:
opposed protruding surfaces;
at least one bore in each of the opposed protruding surfaces; and
at least one spring clip coupled to the opposed protruding surfaces, the spring clip comprising an engagement bore having a first position aligned with one of the at least one bore such that a bolt on the hub is moveable through the one of the at least one bore and the engagement bore and a second position where an edge of the engagement bore is configured to engage the bolt to inhibit removal of the retainer from the hub, wherein the retainer is releasably coupled to the outboard side of the hub.

4. A method of installing a unitized wheelend on a spindle comprising,
providing a unitized wheelend assembly, wherein the unitized wheelend assembly comprises a hub having an inboard side and an outboard side defining a cavity, an oil seal coupled to the inboard side of the hub, an inboard bearing assembly, a spacer, an outboard bearing assembly, a spindle nut assembly, and a retainer comprising a flanged surface and a plurality of bolt bores on the hub to be inserted through the bolt bores such that the retainer is releasably coupled to the outboard side of the hub by threading at least one nut on the at least one bolt of the hub;
aligning the unitized wheelend assembly with a spindle;
inserting the unitized wheelend assembly onto the spindle until a portion of the spindle extends beyond the retainer;
firstly spinning the unitized wheelend assembly to align the spindle nut assembly with the spindle;
secondly spinning the unitized wheelend assembly to set the inboard and outboard bearing assemblies; and
removing the retainer by removing the at least one nut from the at least one bolt wherein the spindle nut assembly is disposed of within the hub.

5. The method of claim 4 wherein
providing a unitized wheelend assembly includes providing an alignment insert; and
inserting the unitized wheelend assembly onto the spindle until a portion of the spindle extends beyond the retainer includes pushing the alignment insert out through a bore in the retainer.

6. The method of claim 4 wherein removing the retainer includes compressing at least one spring clip.

* * * * *